US012371939B2

(12) United States Patent
Licko et al.

(10) Patent No.: US 12,371,939 B2
(45) Date of Patent: Jul. 29, 2025

(54) WINDOW LIFT OF A MOTOR VEHICLE AND METHOD OF MOUNTING A CABLE DRUM

(71) Applicant: Brose Fahrzeugteile SE & Co. Kommanditgesellschaft, Bamberg, Bamberg (DE)

(72) Inventors: Lubos Licko, Nitrianske Pravno (SK); Thomas Krieger, Breitengüssbach (DE); Martin Janos, Spisske Vlachy (SK)

(73) Assignee: Brose Fahrzeugtelle SE & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 18/348,510

(22) Filed: Jul. 7, 2023

(65) Prior Publication Data

US 2023/0349221 A1 Nov. 2, 2023

Related U.S. Application Data

(63) Continuation of application No. PCT/EP2021/085583, filed on Dec. 14, 2021.

(30) Foreign Application Priority Data

Jan. 7, 2021 (DE) ..................... 10 2021 200 084.3

(51) Int. Cl.
*E05F 15/689* (2015.01)
*E05F 11/48* (2006.01)

(52) U.S. Cl.
CPC ........ *E05F 15/6909* (2024.01); *E05F 11/483* (2013.01); *E05F 15/689* (2015.01);
(Continued)

(58) Field of Classification Search
CPC .............. E05F 15/6909; E05F 15/6914; E05F 15/6916
See application file for complete search history.

(56) References Cited

U.S. PATENT DOCUMENTS 5,816,733 A * 10/1998 Ishikawa ............... B60R 16/027 242/378.1
5,890,321 A * 4/1999 Staser .................... B60J 5/0416 49/502
(Continued)

FOREIGN PATENT DOCUMENTS

DE 102006033519 A1 * 1/2008 ............ E05F 11/483
DE 102007014935 A1 * 9/2008 ............ E05F 15/697
(Continued)

*Primary Examiner* — Catherine A Kelly
(74) *Attorney, Agent, or Firm* — Laurence A. Greenberg; Werner H. Stemer; Ralph E. Locher

(57) ABSTRACT

A window lift for a motor vehicle contains a functional support for at least one guide rail, which slidably guides a rail slider for retaining a vehicle window, and a cable drive device. The cable drive device has an actuating drive and a cable drive housing, into which a cable drum, which can be coupled to the actuating drive and can be rotated about an axis of rotation, is or can be received, around which cable drum a pull cable is or can be wrapped. The cable drive housing has a bottom plate and a number of cylindrical wall elements for receiving the cable drum. The functional support has, at the periphery of a through-opening for the coupling of the cable drum to the actuating drive, a joining contour for establishing a form-locking connection to the cable drum housing when the cable drum is inserted therein.

11 Claims, 7 Drawing Sheets

(52) U.S. Cl.
CPC ....... *E05Y 2201/10* (2013.01); *E05Y 2201/64* (2013.01); *E05Y 2201/66* (2013.01); *E05Y 2201/664* (2013.01); *E05Y 2900/55* (2013.01)

(56) References Cited

U.S. PATENT DOCUMENTS

| | | | | |
|---|---|---|---|---|
| 7,044,412 | B2 * | 5/2006 | Hemond | E05F 15/697 242/390.8 |
| 7,823,329 | B2 * | 11/2010 | Stahn | E05F 11/483 49/352 |
| 8,627,745 | B2 * | 1/2014 | Uchimura | E05F 15/697 74/606 R |
| 11,187,024 | B2 | 11/2021 | Kalb et al. | |
| 11,313,166 | B2 * | 4/2022 | Kalb | E05F 15/697 |
| 11,396,769 | B2 * | 7/2022 | Kalb | E05F 15/697 |
| 2002/0007596 | A1 * | 1/2002 | Cabanne | E05F 11/483 49/352 |
| 2006/0130405 | A1 * | 6/2006 | Hemond | E05F 15/697 49/352 |
| 2016/0036287 | A1 * | 2/2016 | Hazel | E05F 15/697 310/83 |
| 2019/0040668 | A1 | 2/2019 | Muramatsu et al. | |
| 2019/0218846 | A1 * | 7/2019 | Kalb | E05F 15/689 |

FOREIGN PATENT DOCUMENTS

| | | | | |
|---|---|---|---|---|
| DE | 102007030044 | A1 | 1/2009 | |
| DE | 202007012996 | U1 * | 3/2009 | B60J 5/0468 |
| DE | 102007063655 | A1 | 4/2009 | |
| DE | 102016216879 | A1 | 3/2018 | |
| DE | 102016216884 | A1 * | 3/2018 | E05F 11/483 |
| DE | 102018201023 | A1 | 7/2019 | |
| DE | 102020201696 | A1 * | 8/2021 | |
| JP | 2003526558 | A * | 9/2003 | |
| WO | WO-2009106541 | A1 * | 9/2009 | E05F 11/483 |
| WO | 2011095414 | A1 | 8/2011 | |
| WO | WO-2020234356 | A1 * | 11/2020 | B60J 5/0416 |

* cited by examiner

WINDOW LIFT OF A MOTOR VEHICLE AND METHOD OF MOUNTING A CABLE DRUM

CROSS-REFERENCE TO RELATED APPLICATION

This application is a continuation, under 35 U.S.C. § 120, of copending International Patent Application PCT/EP2021/085583, filed Dec. 14, 2021, which designated the United States; this application also claims the priority, under 35 U.S.C. § 119, of German Patent Application DE 10 2021 200 084.3, filed Jan. 7, 2021; the prior applications are herewith incorporated by reference in their entirety.

FIELD AND BACKGROUND OF THE INVENTION

The invention relates to a window lift for a motor vehicle, having a functional carrier for at least one guide rail, which slidably guides a rail slider for holding a vehicle window, and having a cable drive device. It furthermore relates to a method for mounting a cable drum in or on a functional carrier of such a window lift.

The vehicle windowpanes are typically moved between a closed position and an open position by means of electrically or electromotively operated actuating devices as (vehicle) window lifts. A window lift of this type contains an (electric) actuating motor as the cable or actuating drive and an actuating mechanism which connects the actuating motor to the windowpane or is coupled thereto in terms of power transmission and which is assigned to a motor vehicle door or to a motor vehicle body. The actuating mechanism is mechanically connected here by means of at least one driver or rail slider with a driver function, which is guided displaceably on a guide rail, to the windowpane to be moved.

In order to guide the rail slider on the guide rail, the actuating mechanism contains a flexible traction means, for example in the form of a Bowden cable or a sheathless traction cable (not a Bowden cable) in order to move the windowpane along the adjustment path between the closed position and the open position. The traction cable is generally guided via deflection elements, for example deflection pulleys, of the window lift, said deflection elements, like the respective guide rail and the actuating drive, being arranged as part of a cable drive device on or at an assembly carrier or door module carrier, which is referred to below as a functional carrier, for example in the form of an inner door plate, or being fastened to said carrier. Window lifts having cable traction mechanisms of this type are also referred as cable traction window lifts.

The cable drive device conventionally contains a cable drum which is rotationally driven by the actuating drive or cable drive and around which the traction cable is wrapped and, for this purpose, has a helical or spiral cable channel (cable groove) in which the traction cable, for example in the form of a cable loop, typically having a plurality of windings that are spaced apart axially, lies. A cable drum around which the traction cable is wrapped and which is generally mounted rotatably at a housing-side bearing point in a cable drive housing, is rotationally driven by means of the (electric) actuating motor, conventionally via a gearing coupled thereto, in particular in the form of a worm gearing as a 90° deflection gearing. In other words, the actuating drive, in particular an electric motor with the gearing coupled thereto, and the cable drive housing with the cable drum which is received therein and on which the traction cable is wound or can be wound, form the cable drive device.

As a result of a rotational movement of the cable drum, the traction cable is wound with a cable portion (cable end) onto the cable drum and, with the cable portion or another cable portion (cable end), is unwound from the cable drum. As a result, the cable loop formed by the traction cable is displaced, and this in turn leads to a movement of the rail slider along the guide rail and therefore to an adjustment of the windowpane between the closed position and the open position.

The window lift (window lift assembly) known from published, non-prosecuted German patent application DE 10 2018 201 023 A1 has a cable drive housing of three-armed star shape having a housing contour which is raised axially—with respect to the axis of rotation of the cable drum—and having an axially extending housing wall which partially surrounds the cable drum, together with the housing contour, forms an acute-angled incoming and outgoing region for the incoming and outgoing cable portion of the traction cable.

The cable drive housing is conventionally configured structurally, by design and in terms of power and certain vehicle systems or vehicle door systems or door modules and cannot be readily transferred to other systems. Thus, frequently, simply because of different positions, fastening patterns and/or screw-on layouts and as a result of asymmetries in the right-hand and left-hand vehicle door, even in the same motor vehicle, different shapes or different designs of the cable drive housing have to be provided. This is undesirably associated with a correspondingly high outlay on material, manufacturing and costs

SUMMARY OF THE INVENTION

The invention is based on the object of specifying a window lift (window lift system, window lift assembly) having a particularly suitable cable drive device. In particular, a cable drive housing or cable drum housing of the cable drive device is intended to be suitably usable as universally as possible even for different window lifts or window lift systems (window lift assemblies) and/or in the vehicle doors (left-hand and right-hand vehicle door) of the same motor vehicle. Furthermore, a particularly suitable method for mounting a cable drum, in particular with a traction cable already wound up, in or on a functional carrier of a window lift is intended to be specified.

With the foregoing and other objects in view there is provided, in accordance with the invention, a window lift for a motor vehicle which has a vehicle window. The window lift contains at least one guide rail, a rail slider for holding the vehicle window, and a functional carrier for supporting the at least one guide rail. The at least one guide rail slidably guides the rail slider holding the vehicle window. A cable drive device is supported by the functional carrier. The cable drive device has an actuating drive, a cable drum, a traction cable and a cable drive housing. The cable drum is disposed in the cable drive housing and is couplable to the actuating drive and is rotatable about an axis of rotation and around the cable drum the traction cable is wrapped. The cable drive housing has a base plate and a plurality of wall elements, and between the wall elements the cable drum is disposed. The functional carrier has, in its circumference a through opening and through the through opening a coupling of the cable drum to the actuating drive occurs. The functional carrier further has a joining contour which provides a form-fitting connection to the cable drum housing with the cable drum inserted in the cable drum housing.

This object is achieved according to the invention with respect to the window lift of a motor vehicle by the features of the independent window lift claim and in respect of the mounting method by the features of the independent mounting method claim. Advantageous refinements and developments are the subject matter of the dependent claims.

The window lift, in particular in the form of a window lift system or window lift assembly, for a motor vehicle has a functional carrier for at least one guide rail, which slidably guides a rail slider, in particular with a driver function for holding a vehicle window, and a cable drive device. The functional carrier which, for example, is part of a door module of a motor vehicle door, is suitably a plate-like component which is configured as a molded part with impressions and/or contours and is formed, for example, as a plastics injection molded part or as a punched and bent part made from metal sheet. In particular, the or each guide rial can be integrated in the functional carrier as a rail contour for the rail slider.

A "window lift" is understood here and below as also meaning a window lift assembly or, in particular synonymously, a window lift system, preferably when the guide rails with the rail sliders guided slidably thereon and the cable drive device are mounted on the functional carrier or the guide rails are integrated in the functional carrier and the rail sliders and the cable drive device are mounted thereon.

The cable drive device has an, in particular electromotive, actuating drive and a cable drive housing, which is also referred to below as a cable drum housing and in which a cable drum, which is coupled or can be coupled to the actuating drive and is rotatable about an axis of rotation, is received or can be received. In the case of an electric motor of the actuating drive, the electric motor having a motor shaft, the electric motor is an electric motor (without brushes or with brushes) which is preferably coupled to a worm gearing as a 90° deflection gearing. The motor shaft bears a rotor, suitably a commutator which is provided with a coil winding or motor winding and is brushed over by carbon brushes which are energized or can be energized. The rotor and a stator, which is suitably formed from permanent magnets, are received in an, in particular pot-like, motor housing (pole pot) of the electric motor (commutator motor).

The cable drum is wrapped around by a traction cable which is connected or can be connected to the or each rail slider. In the mounted state on the cable drum, the traction cable is suitably wound up with a plurality of turns so as to form an incoming and an outgoing cable portion, the cable portions being guided via deflection elements. The lateral surface of the cylindrical cable drum has a helical or spiral cable channel (cable groove) in which the traction cable lies and is guided on the drum side.

The cable drive housing has a, preferably circular or round, base plate and a number of wall elements between which the cable drum is arranged. The wall elements are expediently integrally formed on the base plate and extend axially—with respect to the axis of rotation of the cable drum. The wall elements are particularly advantageously designed as axial portions which are in the manner of lateral surfaces of a cylinder and of which preferably three such elements or portions are provided and between which recesses or intermediate spaces are formed. In a suitable manner, a central, preferably cylindrical, receptacle is provided in the base plate. The receptacle preferably serves as a receptacle for a shaft journal of a gearing part (bearing journal or joining journal) of the actuating drive or cable drive.

The functional carrier has a joining contour for producing a form-fitting connection, in particular an axial form fit, with the cable drive housing or cable drum housing. The carrier-side joining contour is arranged on the circumference of a carrier-side through opening via which the coupling of the actuating drive or cable drive to the cable drum sitting (received, arranged) in the cable drive housing or cable drum housing takes place or is produced.

A "form fit" or a "form-fitting connection" between at least two interconnected parts is understood here and below as meaning in particular that the interconnected parts are held together at least in one direction by direct intermeshing of contours of the parts themselves or by indirect intermeshing via an additional connecting part. "Blocking" of a mutual movement in this direction therefore takes place as a result of the shape.

In one advantageous refinement, the cable drive housing has at least one joining groove which is accessible (azimuthally) in the circumferential direction. The cable drum has at least one radial joining element which may be introduced into the housing-side joining groove by means of a rotational movement of the cable drive housing in relation to the cable drum—or conversely by means of a rotational movement of the cable drum in relation to the cable drive housing. The or each drum-side joining element is suitably an annular radial segment protruding radially over the drum body or the drum casing of the cable drum.

According to an expedient development, the cable drive housing has at least one latching element for latching the cable drum to the cable drive housing. The latching element is suitably provided on the base plate and/or on an, in particular sleeve-like, receptacle which is arranged (centrally) on the base plate and is intended for a shaft journal or gearing journal of the cable drive housing. The latching or joining element there preferably extends radially and, during the mounting of the cable drum, engages in a corresponding, drum-side groove (annular groove).

Additionally or alternatively, radially outer and/or radially inner latching elements are particularly preferably provided in the region between the axial wall elements of the cable drive housing. The radially outer latching elements are suitably gripped from behind by (the) radial joining elements of the cable drum as the cable drum is being inserted into the cable drive housing, with a latching connection being produced.

The cable drum suitably has a central receiving opening with a drum-side joining contour for producing a, preferably form-fitting, joining connection to the actuating drive. The respective radial joining element of the cable drum is preferably integrally formed on that end face of the cable drum, which end face is opposite the central receiving opening. Expediently, housing-side joining grooves for drum-side joining elements are provided in the housing-side wall elements, in particular at the transition thereof to the base plate.

During the installation, the cable drum is inserted into the cable drive housing (cable drum housing). In the process, the drum-side joining elements pass into the recesses between adjacent, housing-side wall elements such that the cable drum can subsequently be rotated relative to the cable drive housing and, during the rotational movement, the drum-side joining elements pass into the housing-side joining grooves. The resultantly produced connection of the cable drum to the cable drive housing is therefore undertaken in the manner of a pure plug-in and twist lock or a bayonet lock.

When the cable drive housing is designed with the preferably base-side latching elements provided between the axial wall elements, in the course of the inserting operation the drum-side joining elements latch together with the housing-side latching or joining elements, wherein the cable drum is then axially secured in the cable drive housing and is arranged or received rotatably therein.

Advantageously, the traction cable is already wound up on the cable drum when the latter is inserted into the cable drive housing by means of the plug-and-turn lock and then the form fitting connection is established with the carrier-side joining contour. In the form-fitting connection of the cable drive housing with the carrier-side joining contour, the cable drum is freely rotatable in the cable drive housing, in that the drum-side joining elements can slide in both directions of rotation through the housing-side joining grooves which are open on both sides in the circumferential direction.

In an expedient refinement, the wall elements of the cable drive housing have a stepped form in the axial direction. Alternatively, a bevel or bevel-like transition can be formed or provided between the wall element and the base plate of the cable drive housing. Suitably, an in particular annular or annular-segment-shaped contact collar is formed between a radially outer and a radially inner wall region of the respective wall element. Advantageously, by means of the step shape or by means of the bevel-like transition between the base plate and the wall element, the housing-side joining groove for the drum-side, radially oriented joining element is formed radially on the inside of the respective wall element.

Furthermore advantageously, the housing-side contact collar, formed radially on the outer side of the wall elements, in particular by means of the step form, corresponds to a (carrier-side) supporting collar provided in the region of the joining contour of the functional carrier. In other words, the or each wall element of the cable drive housing and the joining contour of the functional carrier have corresponding contact or supporting contours which provide an axial stop for the cable drive housing with the cable drum which is received therein and has a wound-up traction cable, at least during or in the course of the production of the joining or form-fitting connection between the cable drive housing and the functional carrier.

In an advantageous refinement, the carrier-side joining contour has a number of latching elements, in particular in the form of axial latching arms with radially inwardly directed latching hooks. In the form-fitting connection with the cable drive housing, the carrier-side latching elements engage over the base plate thereof on the plate side facing away from the housing side wall elements.

According to a suitable development of the carrier-side joining contour, the latter has a number of, in particular cylindrical, coaxial wall portions. The (axial) stop, which is effective at least during or in the course of the production of the joining or form-fitting connection, for the cable drive housing with the cable drum which is already received therein and around which the traction cable is wrapped is provided on the carrier side by a radially inner portion of said coaxial wall portions of the joining contour of the functional carrier. The wall portion forms a, preferably circumferentially interrupted, contact surface as a supporting contour for the cable drive housing.

A further, in particular central portion, of the coaxial wall portions forms a further, preferably circumferentially again interrupted, contact surface as a supporting contour for the cable drive housing. A (radially) outer of the coaxial wall portions of the joining contour of the functional carrier suitably has a, preferably conical, contact surface for the base plate of the cable drive housing of the cable drum inserted therein. The housing-side base plate can also have a (corresponding) conical plate edge.

The (radially) outer portion of the coaxial wall portions preferably carries the latching elements or latching arms. The latching hooks thereof protrude axially over the coaxial wall portions of the carrier-side joining contour. In a suitable manner, the cable drum housing with the cable drum inserted therein is held in the joining contour of the functional carrier for conjoint rotation. Preferably used for this purpose are circumferential recesses or axial grooves in the carrier-side joining contour or between the coaxial wall portions thereof, in which axial grooves the axially oriented wall elements of the cable drive housing engage, in particular in a form-fitting manner (azimuthally) in the circumferential direction.

In addition, preferably two, recesses are provided in the wall portions, via which recesses the incoming or outgoing cable portion of the traction cable is guided out of the cable drive housing and out of the carrier-side joining contour. The housing-side recesses between the wall elements of the cable drive housing are aligned here with the recesses of the carrier-side joining contour.

In the course of the joining or form-fitting connection, the insertion depth of the cable drive housing into the carrier-side joining contour is advantageously axially limited by means of the carrier-side wall portions. In addition, the cable drum with the traction cable wound thereon is secured in the cable drive housing by the twist lock. As soon as the cable drive or actuating drive is coupled to the cable drum via the through opening surrounded by the carrier-side joining contour, the cable drum is secured axially in both axial directions and is freely rotatable in the cable drive housing.

In the method for mounting a cable drum for a traction cable on a functional carrier, the cable drum with the traction cable already wound thereon is inserted into the cable drive housing (cable drum housing). Subsequently, the cable drive housing or cable drive drum housing with the cable drum which is accommodated therein and around which the traction cable is wrapped is joined in a form-fitting manner to the functional carrier, in particular axially.

Other features which are considered as characteristic for the invention are set forth in the appended claims.

Although the invention is illustrated and described herein as embodied in a window lift of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Mutually corresponding parts and sizes are provided with the same reference signs throughout the figures.

Figure 1:
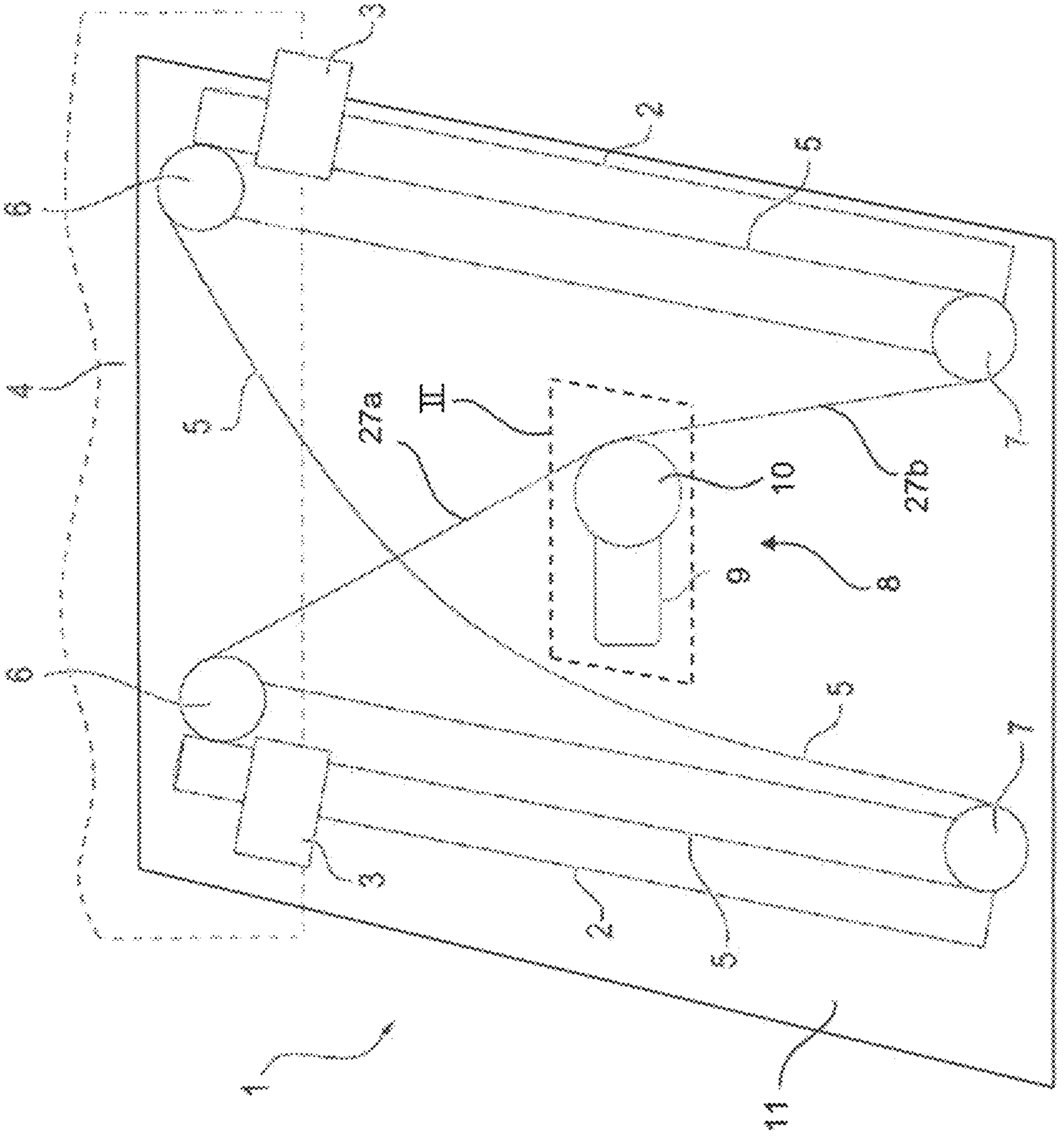
FIG. 1 is a schematic view of a window lift (window lift assembly, window lift system) with a plate-like functional carrier and with a cable drive device, and also with two guide rails with rail sliders which are guided thereon and are connected to the cable drive device and have a driver function for a (vehicle) window pane.

Referring now to the figures of the drawings in detail and first, particularly to FIG. 1 thereof, there is shown a window lift 1 of or for a motor vehicle, in the exemplary embodiment what is referred to as a two-strand cable window lift, with two parallel guide rails 2, on which rail sliders 3 with a driver function are slidably guided. The windowpane 4 is held, for example fixed by clamping, on the rail sliders 3. The rail sliders 3 are connected to a traction cable 5 which is guided via upper and lower deflection elements 6 or 7, preferably in the form of deflection pulleys, and is coupled to a cable drive device 8. A rotational movement of the preferably electromotive cable drive device 8 leads to the windowpane 4 moving into an open position or—in the opposite direction—into a closed position.

Figure 3:
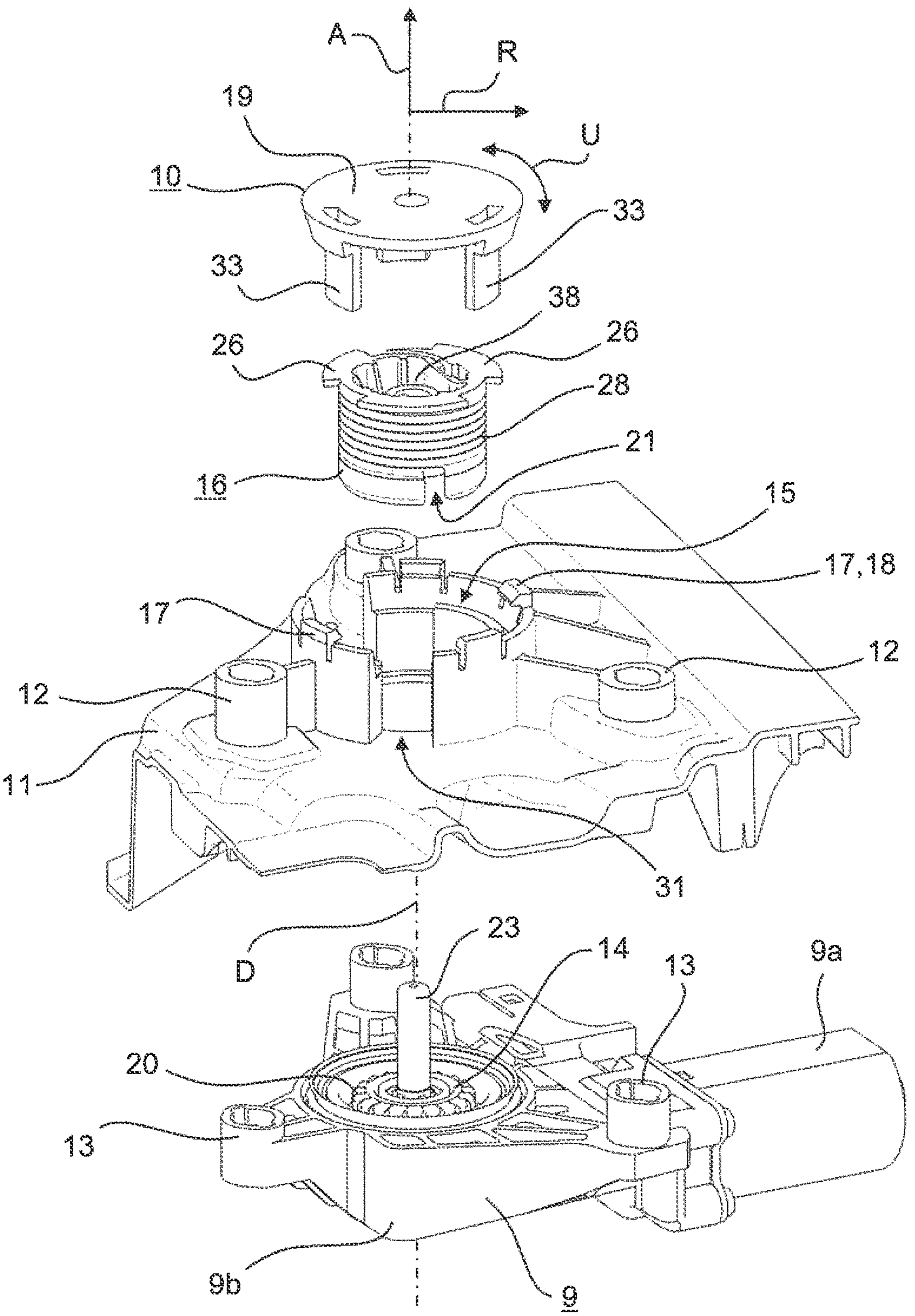
FIG. 3 is an exploded, perspective view of the cable drive device with the cable drive housing and with the cable drum on the carrier side, which has the joining contour, of the (partially shown) functional carrier and with the cable drive (actuating drive) on the other carrier side.

The cable drive device 8 has an actuating drive or cable drive 9 and a cable drum housing or cable drive housing 10 in which a cable drum, which is coupled to the actuating drive 9, is received so as to be rotatable about an axis of rotation D (FIG. 3). The traction cable 5 which is connected to the rail sliders 3 is wrapped around the cable drum. The actuating drive 9 has, in a manner not illustrated specifically, an electric motor which is coupled to a gearing. The cable drive device 8 is mounted on a functional carrier 11 on which the guide rails 2 are mounted or can be integrated therein. In other words, the functional carrier 11, for example as part of a door module of a motor vehicle door, can be a molded part with rail contours already introduced therein as guide rails 2 for the rail sliders 3. The deflection elements 6, 7 can also already be formed in the functional carrier 11.

The window lift 1 with the guide rails 2 and the rail sliders 3 guided thereon and with the cable drive device 8 including the traction cable 5, the cable drive housing 10 and the cable drum can also be referred to here and below as window lift assembly or window lift system.

Figure 2:
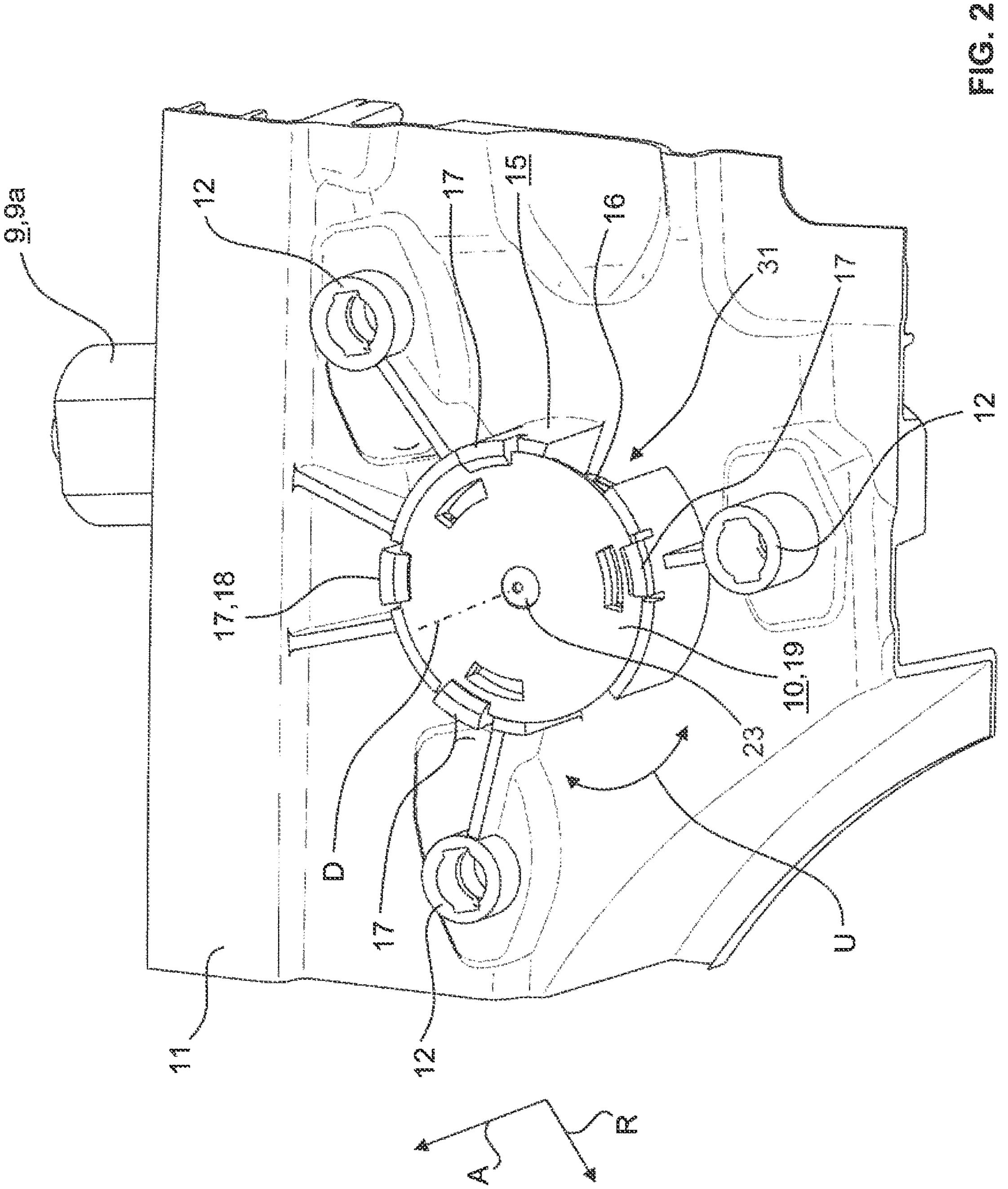
FIG. 2 is a perspective view of detail II shown in FIG. 1 on a larger scale with a cable drive housing which is joined to the functional carrier with the cable drum inserted, looking at a base plate of the cable drive housing, which is latched in a carrier-side joining contour, with or for a cable drum.

FIGS. 2 and 3 show parts of that region of the functional carrier 11 in which the cable drive device 8 is arranged and mounted on the carrier side. As can be seen in FIG. 2, carrier-side fastening points 12 are provided, in the exemplary embodiment three fastening points 12 which are arranged in a star-shaped manner and at which the actuating drive 9 is fastened, in particular fastened by screwing, to the functional carrier 11 by means of joining journals or screw journals 13.

In addition, a motor housing **9*a* of an electric motor can be seen in FIG. 2, the electric motor being coupled to a gearing journal or rotary journal 14, shown in FIG. 3, of the actuating drive (cable drive) 9 of the cable drive device 8. The electric motor of the actuating drive 9 is coupled to a worm gearing as a 90° deflection gearing which is arranged in a gearing housing 9*b* of the actuating drive 9 and has or drives the rotary journal 14. In a manner not illustrated specifically, a motor shaft bears a commutator which is provided with a coil winding or motor winding and is brushed over by carbon brushes which are energized or can be energized. The rotor and a stator, which is formed from permanent magnets, are arranged in the pot-like motor housing 9*a***.

In the preferred embodiment which is shown, a carrier-side joining contour 15 is provided on that side of the functional carrier 11 which faces away from (is opposite to) the cable drive or actuating drive 9, into which joining contour the cable drive housing or cable drum housing 10 with the cable drum 16 received therein is inserted and latched. For this purpose, latching elements 17 of the carrier-side joining contour 15 are provided, the end-side latching hooks 18 of which engage over the base plate 19 of the cable drive housing or cable drum housing 10, which is referred to below merely as cable drive housing. By this means, a form-fitting connection is produced. With respect to the axis of rotation D, shown in FIG. 3, of the cable drum 16 and the axial direction A which is coaxial thereto, an axial form fit of the cable drive housing 10 to the functional carrier 11 via the joining contour 15 thereof is produced here as a form-fitting joining connection.

FIG. 3 shows, in longitudinal section, the cable drive housing 10 with the cable drum 16 which is received therein and is rotatable about the axis of rotation D and is coupled to the actuating drive 9 by an external toothing 20 via the gearing-side rotary journal 14. For this purpose, the cable drum 16 has a central receiving opening 21 with a drum-side joining contour in the form of an internal toothing 22 for producing a form-fitting joining connection to the external toothing 20 of the rotary journal 14 of the actuating drive 9.

A gearing-side shaft journal 23 which reaches through the cable drum 16 is guided into a receptacle 24 which is integrally formed on the base plate 19 of the cable drive housing 10 or is formed in the base plate. The cable drive housing 10 has at least one joining groove 25 which is accessible in the circumferential direction U. The cable drum 16 has at least one joining element 26 which protrudes radially over the drum body or drum casing.

In the joining state, shown in FIG. 3, of the cable drive housing 10 to the functional carrier 11, the cable drum 16 is freely rotatable within the cable drive housing 10 in both directions of rotation about the axis of rotation D, with the drum-side joining element 26 being able to pass the housing-side joining groove 25 in both directions of rotation virtually without any contact.

Figure 7:
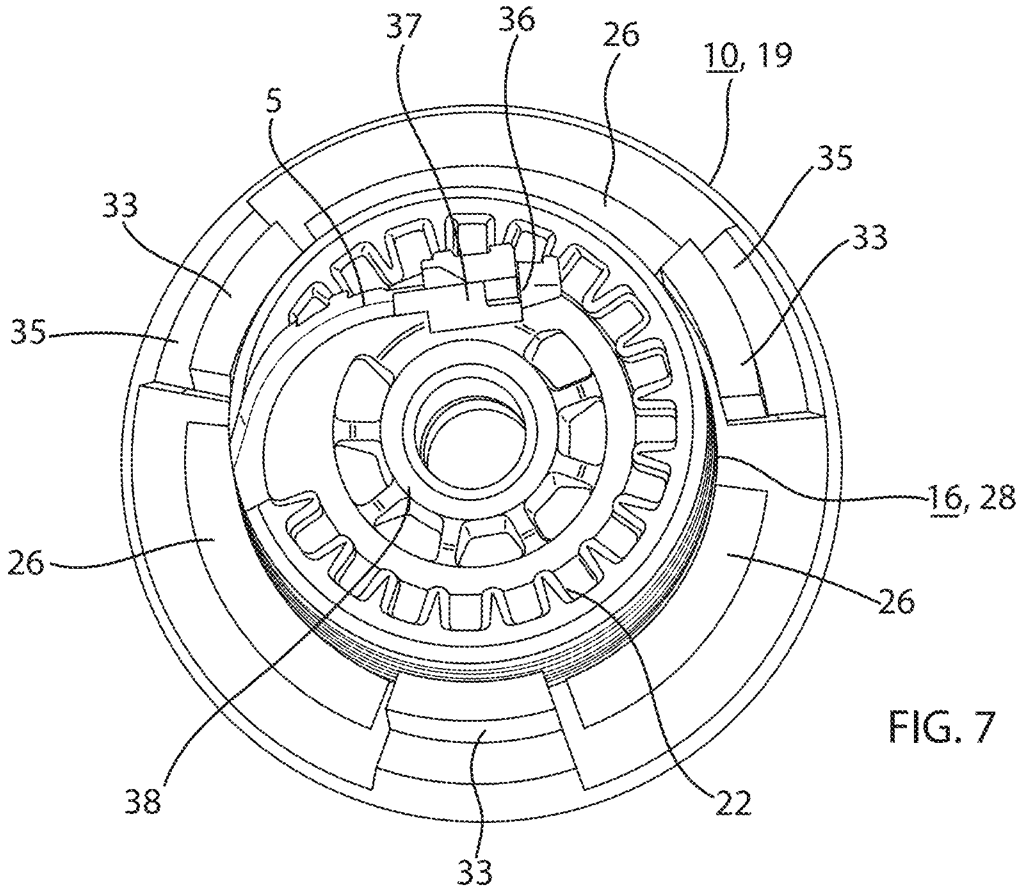
FIG. 7 is a top, perspective view of the cable drive housing (cable drum housing) with the cable drum, which is received therein and has a traction cable wound thereon, of a receiving opening with a drum-side joining contour for the actuating drive.

The traction cable 5 is wrapped around the cable drum 16, as can be seen in FIG. 7. For this purpose, in the mounted state, the traction cable 5 is wound onto the cable drum 16 with a plurality of turns, forming an incoming cable portion, denoted by 27*a* in FIG. 1, and an outgoing cable portion, denoted by 27*b* in FIG. 1, the cable portions 27*a*, 27*b* being guided via the deflection elements 6, 7. For this purpose, the lateral surface side of the cylindrical cable drum 16 has a helical or spiral cable channel (cable groove) 28 in which the traction cable 5 lies.

Figure 4:
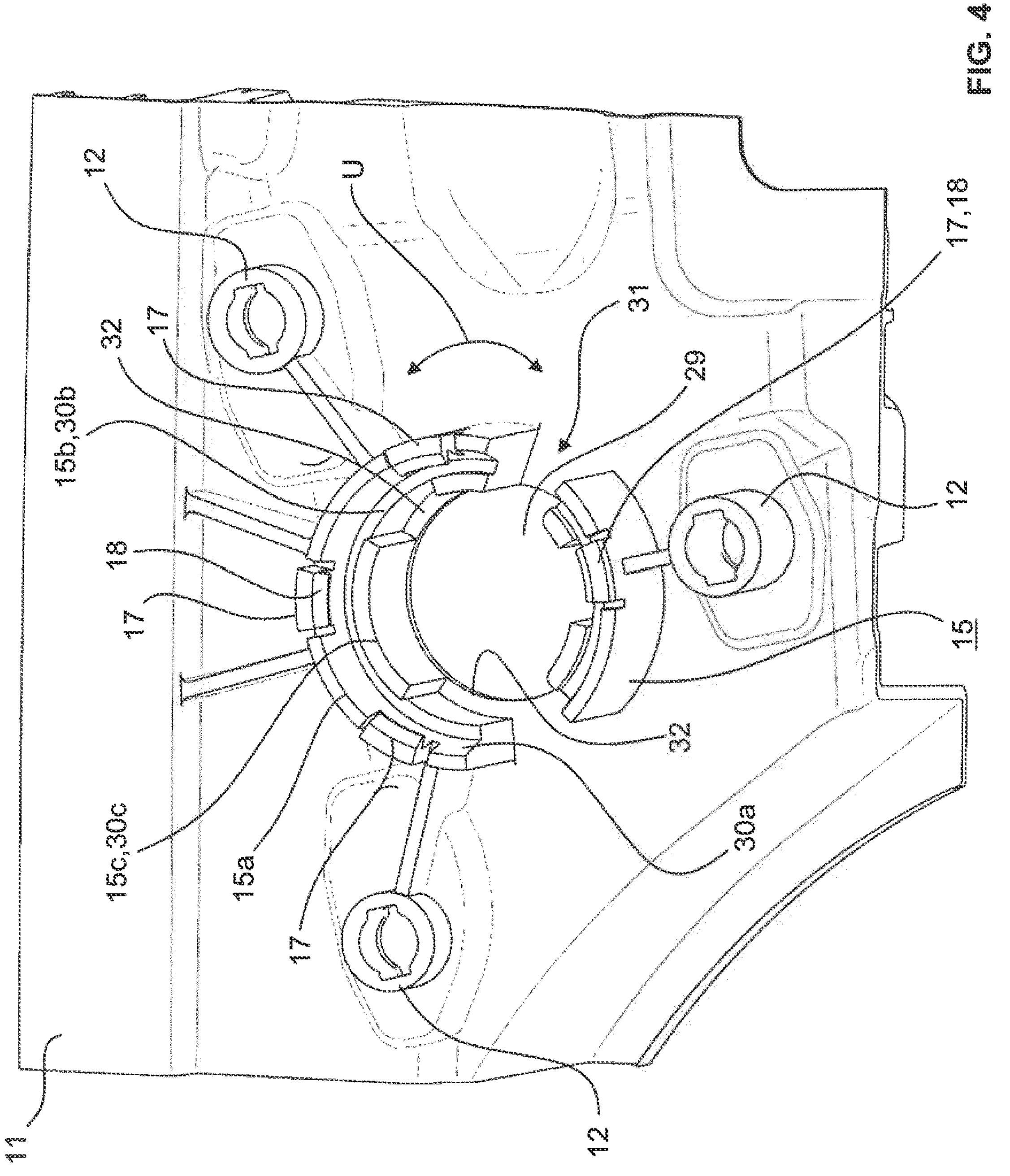
FIG. 4 is a perspective view of a part of the functional carrier looking at the joining contour thereof in a region of a carrier-side through opening as a coupling point or coupling interface between the cable drum and the actuating drive (cable drive)

FIG. 4 shows the relevant detail of the functional carrier 11 in the region of the joining contour 15 thereof for producing the form-fitting connection to the cable drive housing or cable drum housing 10. The carrier-side joining contour 15 is arranged on the circumference of a carrier-side through opening 29 via which the actuating drive or cable drive 9 is coupled to the cable drum 16 received in the cable drive housing or cable drum housing 10. The carrier-side joining contour 15 has a number of cylindrical coaxial wall portions, namely a radially outer wall portion 15*a*, a radially central wall portion 15*b* and a radially inner wall portion 15*c*. The central wall portion 15*b* has a lower axial height than the inner and the outer wall portions 15*c* and 15*a*. In addition, the outer wall portion 15*a* protrudes over the inner wall portion 15*b*. Latching elements 17 as latching arms with the latching hooks 18 are integrated in the outer wall portion 15*a*. The latching elements protrude axially over the inner wall portion 15*b*, i.e. in the axial direction A which is coaxial with respect to the axis of rotation D. The central wall portion 15*b* and the inner wall portion 15*c* form supporting or contact surfaces 30*b* and 30*c*, respectively, for the cable drive housing 10.

As can be seen comparatively clearly in FIG. 3, the outer wall portion 15*a* forms a conical contact surface 30*a*, which tapers in the axial direction A toward the carrier-side through opening 29, for the base plate 19 of the cable drive housing 10, the base plate preferably likewise being conical on the outer edge side. Two recesses or intermediate spaces 31 in the carrier-side joining contour 15 are provided in the circumferential direction U between the wall portions 15*a* to 15*c* which are in the form of lateral surfaces of a cylinder. The incoming and outgoing cable portions 27*a*, 27*b* of the traction cable 5 are led out of the carrier-side joining contour 15 via said recesses 31, in the exemplary embodiment at an angle of approximately 220° to 230° with respect to one another. In addition, in the exemplary embodiment, the carrier-side joining contour 15 has three axial grooves 32 in the radially inner wall portion 15*c*. One of the axial grooves 32 opens into one of the recesses 31.

Figure 5:
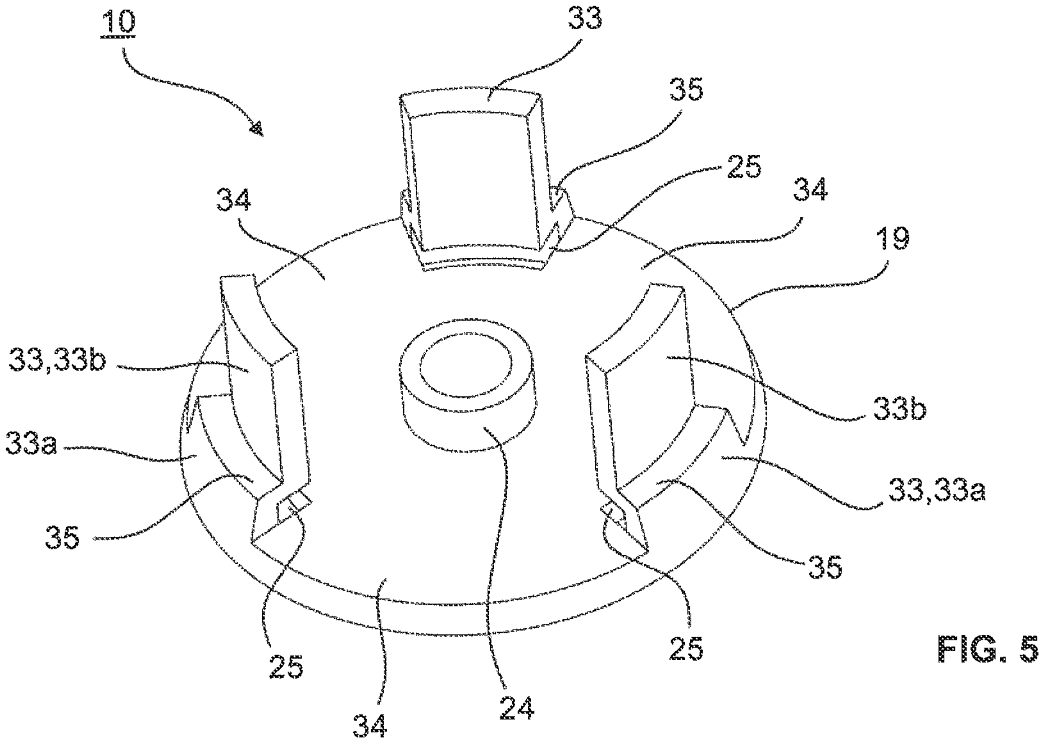
FIG. 5 is a perspective view of the cable drive housing (cable drum housing) with wall elements integrally formed on a base plate.

FIG. 5 perspectively shows the cable drive housing 10 with the preferably round base plate 19. On the latter, in the exemplary embodiment, there are integrally formed three axially extending wall elements 33 between which the cable drum 16 is received. The wall elements 33 are configured as axial portions which are in the manner of lateral surfaces of a cylinder and between which axial recesses or intermediate spaces 34 are formed. The wall elements 33 are step-shaped in the axial direction A. An annular or ring-segment-shaped contact collar 35 is formed between a radially outer (lower) and a radially inner (upper) wall region 33*a* and 33*b*, respectively, of the respective wall element 33. The step shape results in the formation of the respective housing-side joining groove 25 on the inner side of the corresponding wall element 33. The cable drive housing 10 has three such joining grooves 25 because of the three wall elements 33 here.

The housing-side contact collar 35 corresponds to the central wall portion 15*b* of the carrier-side joining contour 15. The housing-side base plate 19 corresponds to the inner wall portion 15*c* of the carrier-side joining contour 15. In this way, the wall elements 33 and the base plate 19 of the cable drive housing 10, on the one hand, and the joining contour 15 of the functional carrier 11 have corresponding contact or supporting contours. In other words, the cable drive housing 10 can be supported with its wall-element-side contact collar 35 and with its base plate 19 on the plate edge side on the supporting or contact surfaces 30*b*, 30*c*. The supporting function forms an axial stop for the cable drive housing 10, in particular when the latter with the cable drum 16 which is arranged therein and has the traction cable 5 wound up thereon is inserted into the carrier-side joining contour 15, thereby producing the joining connection or form-fitting connection.

If the cable drive housing 10 is inserted into the carrier-side joining contour 15, the housing-side wall elements 33 engage in the carrier-side axial grooves 32 of the wall portion 15*c*. In the carrier-side joining contour 15, the cable drive housing 10 is arranged nonrotatably on the axial grooves so the cable drum 16 can rotate about the axis of rotation D.

Figure 6:
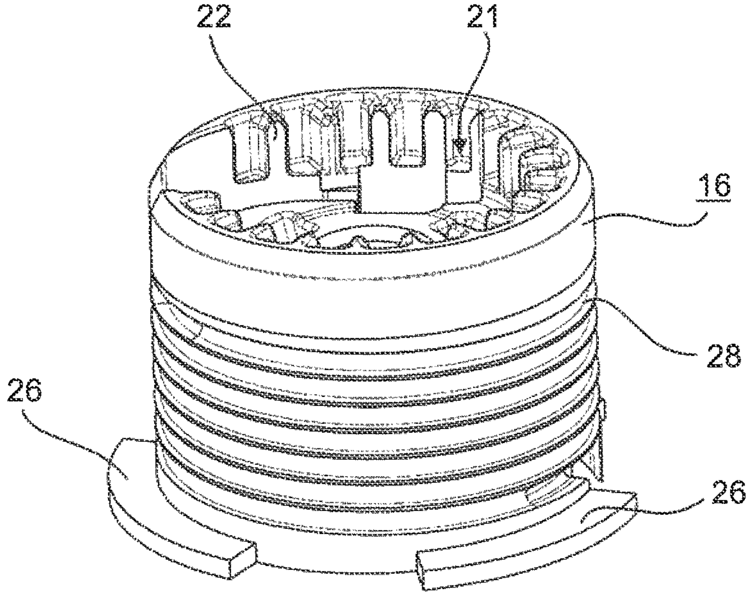
FIG. 6 is a perspective view of the cable drum with radially oriented joining elements on a drum end face.

FIGS. 6 and 7 show the cable drive housing 10 with the cable drum 16 received therein without and with a traction cable 5 wound up thereon. The drum-side receiving opening 21 with the internal toothing 22 can be seen. The three radially protruding, circular-ring-segment-like joining elements 26 of the cable drum 16 in the exemplary embodiment are provided on the end face of the cable drum that faces away from the receiving opening 21 and, in the mounted state, faces the housing-side base plate 19 and are integrally formed there on the cable drum 16. By means of a rotational movement of the cable drive housing 10 in relation to the cable drum 16—or vice versa—the drum-side joining elements 26 engage in the housing-side joining grooves 25. In the joining state, the cable drum 16 is axially secured in the cable drive housing 10.

FIG. 7 shows the cable drive housing 10 with the cable drum 16 which is received therein and has a traction cable 5 wound up thereon. On the drum edge side in the region of the receiving opening 21 a nipple chamber 36 is provided in which a cable nipple 37 fastened to a cable end of the traction cable 5 sits. On that drum end face on which the cable drum 16 has the internal toothing 22, the housing-side receptacle 24 is received in a drum-side central recess or receiving contour 38 of the cable drum 16. By this means, the cable drum 16 is secured radially in the cable drive housing 10 by the carrier-side joining contour 15 and/or by the respective latching element 39, 40 or 41 described below.

Figure 8:
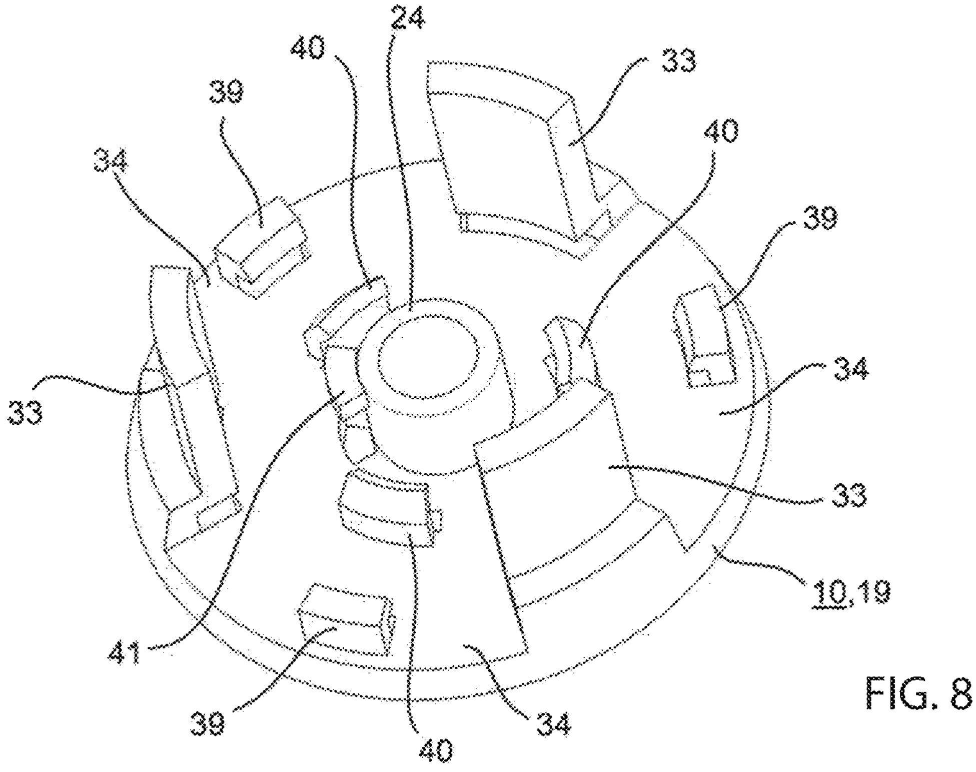
FIG. 8 is a perspective view of a variant of the cable drive housing (cable drum housing) with latching elements for producing a joining connection of the cable drive housing to the cable drum.

According to the variant of the cable drive housing 10 that is shown in FIG. 8, the cable drive housing has at least one such latching element or a number of such latching elements for producing a latching or joining connection of the cable drum 16 to the cable drive housing 10. In the exemplary embodiment, three radially outer latching elements 39 which are provided on the base plate 19, and are preferably formed from the latter, are shown. The radially outer latching elements 39 are provided in the housing-side intermediate spaces 34 between wall elements 33 which are adjacent in the circumferential direction U.

It can be seen, in the exemplary embodiment, that likewise three radially inner latching elements 40 can also be provided, the latching elements likewise being provided on the base plate 19, preferably being formed from the latter, and being arranged in the housing-side intermediate spaces 34.

An individual latching element 41 can also be provided on the sleeve-like receptacle 24 of the cable drive housing 10. The latching or joining element 41 there extends radially and, during the mounting of the cable drum 16, engages in a manner not illustrated specifically in a drum-side annular groove, in particular in the region of the recess or receiving contour 38 of the cable drum 16.

The cable drive housing 10 can have merely one of the variants of the latching elements 39, 40, 41 or also two of the variants or also all three variants of the latching elements 39, 40 and/or 41.

Figure 9:
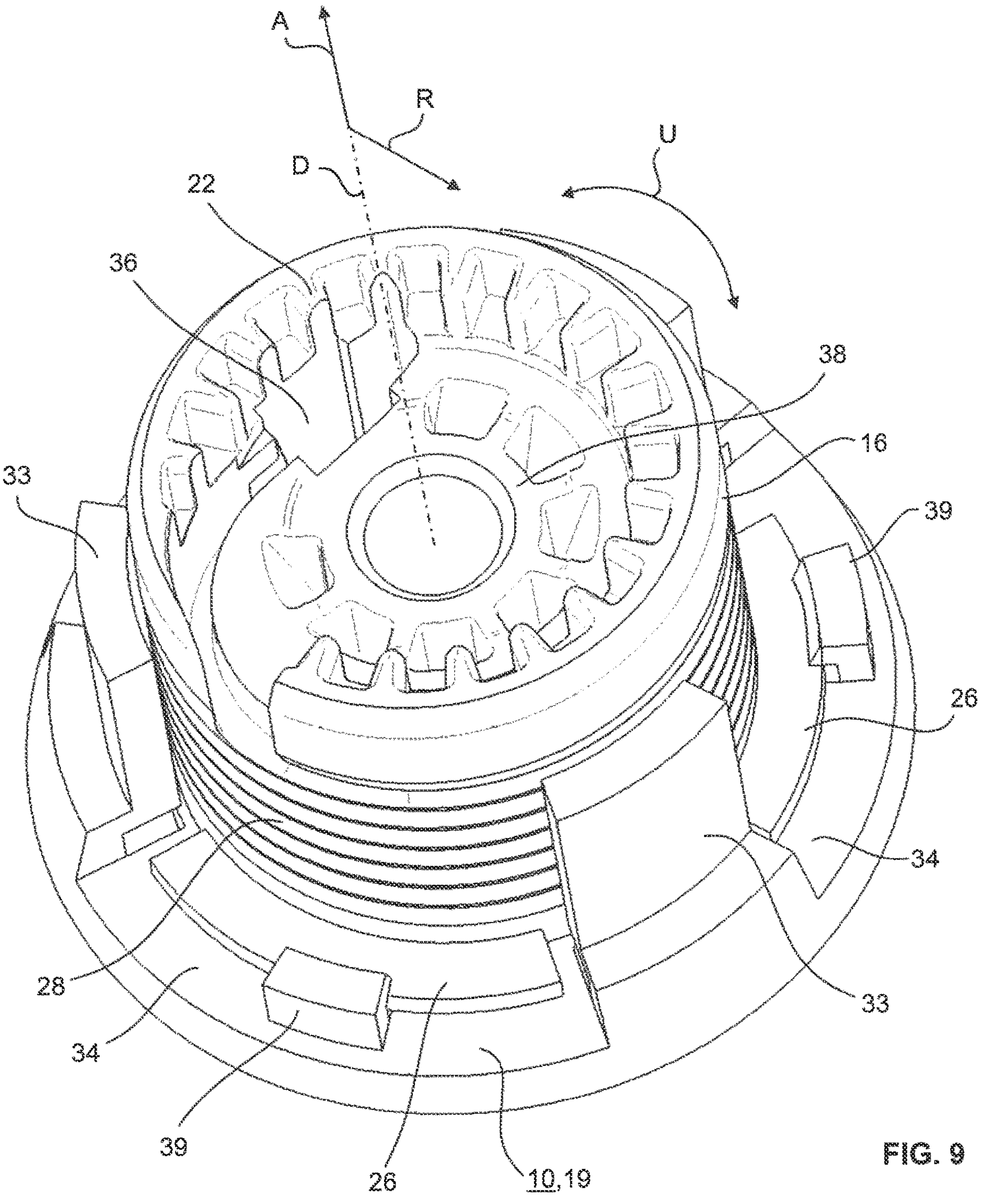
FIG. 9 is a perspective view of the cable drum (without a traction cable) which is received in the cable drive housing (cable drum housing) according to FIG. 8 and is latched thereto.

As can be seen in FIG. 9, the radially outer latching elements 39 are engaged behind by the radial joining elements 26 of the cable drum 16 during the insertion into the cable drive housing 10, with a latching connection being produced.

During the installation, the cable drum 16 with the traction cable 5 already wound up thereon is inserted into the cable drive housing (cable drum housing) 10. In the process, the drum-side joining elements 26 pass into the recesses 34 between the housing-side wall elements 33 such that the cable drum 16 can subsequently be rotated relative to the cable drive housing 10 and, during the rotation movement, the drum-side joining elements 26 pass into the housing-side joining grooves 25. The resultantly produced connection of the cable drum 16 to the cable drive housing 10 is undertaken in the manner of a pure plug-in and twist lock or bayonet lock. The twist lock secures the cable drum 16 with the wound-up traction cable 5 in the cable drive housing 10, in particular for preparation purposes and during the mounting of the cable drum housing 10 at or on the functional carrier 11.

The cable drive housing 10 is formed with the latching element 41 on the receptacle 24 or with the base-side latching elements 40 and/or 41 provided between the axial wall element 33, during the insertion the cable drum 16 is latched to the cable drive housing 10. In the case of the radially outer latching element 39, the latching takes place with the drum-side joining elements 26, as can be seen from FIG. 9. After the latching has taken place, the cable drum 10 is axially secured in the cable drive housing 10 and is nevertheless arranged rotatably therein.

Subsequently, the cable drive housing or cable drum housing 10 with the cable drum 16 which is received therein and around which the traction cable 5 is wrapped is joined in a form-fitting manner to the functional carrier 11. During the joining or form-fitting connection, the insertion depth of the cable drive housing 10 into the carrier-side joining contour 11 is limited axially by the corresponding carrier-side wall portions 15. If the actuating drive or cable drive 9 is coupled to the cable drum 16 via the through opening 29, which is surrounded by the carrier-side joining contour 15, the cable drum 16 is secured axially in both axial directions A. In the form-fitting connection of the cable drive housing 10 to the carrier-side joining contour 15, the cable drum 16 is freely rotatable in the cable drive housing 10 by the drum-side joining elements 26 being able to slide through the housing-side joining grooves 25 in the circumferential direction U in both directions of rotation.

In summary, the invention relates to a window lift 1 as a window lift assembly or as a window lift system with a functional carrier 11 and with a cable drive device 8 with a cable drive housing 10 in which a cable drum 16, which can be coupled to an actuating drive 9 and around which a traction cable 5 is wrapped, is received, wherein the cable drive housing 10 has a base plate 19 and wall elements 33 for receiving the cable drum 16, and wherein the functional carrier 11 has a joining contour 15 for producing a form-fitting connection with the cable drum housing 10.

The claimed invention is not restricted to the above-described exemplary embodiment. On the contrary, other variants of the invention can also be derived therefrom by a person skilled in the art within the scope of the disclosed claims without departing from the subject matter of the claimed invention. In particular, furthermore all the individual features described in conjunction with the various exemplary embodiments can also be combined in a different way within the scope of the disclosed claims without departing from the subject matter of the claimed invention.

In addition, the described solution can be used not only in the specifically illustrated application, but also in a similar way in other motor vehicle applications, for example in door and tailgate systems, in single-strand window lifts, in vehicle locks, in adjustable seat and interior systems, and in electric drives, controllers, sensors and the arrangement thereof in the vehicle.

The following is a summary list of reference numerals and the corresponding structure used in the above description of the invention.

LIST OF REFERENCE SIGNS

1 window lift/assembly/system
2 guide rail
3 rail slider
4 windowpane
5 traction cable/inner cable
6 upper deflection element
7 lower deflection element
8 cable drive device
9 actuating drive/cable drive
9*a* motor housing
9*b* gearing housing
10 cable drive housing/cable drum housing
11 functional carrier
12 fastening point
13 joining journal/screw journal
14 gearing journal/rotary journal
15 carrier-side joining contour
15*a* outer wall portion
15*b* central wall portion
15*c* inner wall portion
16 cable drum
17 latching element
18 latching hook
19 base plate
20 external toothing
21 receiving opening
22 internal toothing
23 shaft journal/gearing journal
24 receptacle
25 joining groove
26 joining element
27*a* incoming traction cable portion
27*b* outgoing traction cable portion
28 cable groove
29 through opening
30*a* conical contact surface

30*b* supporting surface/contact surface
30*c* supporting surface/contact surface
31 carrier-side recess/intermediate space
32 axial groove
33 wall element
33*a* outer (lower) wall region
33*b* inner (upper) wall region
34 housing-side recess/intermediate space
35 contact collar
36 nipple chamber
37 cable nipple
38 recess/receiving contour
39 latching element
40 latching element
41 latching element
A axial direction
D axis of rotation
U circumferential direction

The invention claimed is:

1. A window lift for a motor vehicle having a vehicle window, the window lift comprising:

at least one guide rail;

a rail slider for holding the vehicle window;

a functional carrier for supporting said at least one guide rail, said at least one guide rail slidably guides said rail slider holding the vehicle window;

a cable drive device supported by said functional carrier, said cable drive device having an actuating drive, a cable drum, a traction cable and a cable drive housing, said cable drum disposed in said cable drive housing and being couplable to said actuating drive and being rotatable about an axis of rotation and around said cable drum said traction cable is wrapped;

wherein said cable drive housing has a base plate and a plurality of wall elements, said wall elements each have a radially outer and a radially inner wall region and between said wall elements said cable drum is disposed;

wherein said cable drive housing has at least one housing side joining groove formed therein which is accessible in a circumferential direction and which is formed on an inner side of said wall elements;

wherein said cable drum has at least one radial joining element which passes into said at least one housing side joining groove by means of a rotational movement of said cable drive housing in relation to said cable drum; and wherein said functional carrier has, in its circumference a through opening formed therein and through said through opening a coupling of said cable drum to said actuating drive occurs, said functional carrier further has a joining contour which provides a form-fitting connection to said cable drum housing with said cable drum inserted in said cable drum housing.

2. The window lift according to claim 1, wherein said cable drum with said traction cable already wound thereon is inserted into said cable drive housing.

3. The window lift according to claim 1, wherein in a preassembled state in said cable drive housing, said cable drum is secured axially in said cable drive housing by a twist lock or a bayonetted lock.

4. The window lift according to claim 1, wherein:

said cable drum has a central receiving opening formed therein and a drum-side joining contour for producing a joining connection to said actuating drive; and said at least one radial joining element is one of a plurality of radial joining elements integrally formed on an end face of said cable drum which is opposite said drum-side joining contour.

5. The window lift according to claim 1, wherein:

said wall elements of said cable drive housing are stepped in an axial direction; and/or said cable drive housing has a bevel or a transition of a bevel disposed between one of said wall elements and said base plate of said cable drive housing; and/or a housing-side abutment collar is formed on an outer side of a respective one of said wall elements.

6. The window lift according to claim 1, wherein said joining contour of said functional carrier has a plurality of latching elements which, in the form-fitting connection with said cable drive housing, engage over said base plate thereof on a plate side facing away from said wall elements.

7. The window lift according to claim 1, wherein:

said joining contour of said functional carrier has a plurality of coaxial wall portions, said plurality of coaxial wall portions includes a radially inner wall portion, a radially outer wall portion, and a radially central wall portion;

said radially inner wall portion of said joining contour of said functional carrier has or forms a contact surface for said wall elements of said cable drive housing with said cable drum inserted therein; and/or said radially central wall portion of said joining contour of said functional carrier has or forms a further contact surface for said base plate of said cable drive housing with said cable drum inserted therein; and/or said radially outer wall portion of said joining contour of said functional carrier has or forms a conical contact surface for said base plate of said cable drive housing with said cable drum inserted therein.

8. The window lift according to claim 1, wherein said cable drive housing has at least one latching element for latching said cable drum to said cable drive housing.

9. The window lift according to claim 8, wherein said at least one latching element is provided on said base plate and/or on a receptacle of said cable drive housing.

10. The window lift according to claim 1, wherein said cable drive housing with said cable drum inserted therein is held non-rotatably in said joining contour of said functional carrier.

11. The window lift according to claim 1, wherein said cable drum rotates within said cable housing drive, where said at least one radial joining element is configured to rotate about and within said at least one housing side joining groove.

* * * * *